Patented Jan. 8, 1952

2,582,055

UNITED STATES PATENT OFFICE 2,582,055

IMPROVED METHOD FOR POLYMERIZING VINYL ACETATE IN TERTIARY BUTYL ALCOHOL

Louis M. Minsk and Erle W. Taylor, Rochester, N. Y., assignors to Eastman Kodak Company, Rochester, N. Y., a corporation of New Jersey No Drawing. Application April 28, 1948,
Serial No. 23,875

12 Claims. (Cl. 260—89.1)

The present invention relates to an improved process for polymerizing vinyl acetate. More particularly, this invention relates to a process for preparing polyvinyl acetate of high molecular weight through the use of a solvent.

The use of solvents in the polymerization of vinyl acetate is well known. Until the present time, however, solvents have not found wide use because of their known tendency to cause the formation of low molecular weight polymers. The reduction in molecular weight is less when some solvents are used than with others, but even in the case of those solvents which are known to cause the least reduction, the molecular weight of vinyl acetate produced in these solvents is too low to warrant their use on a commercial scale, where high polymers are desired. We have now found that high molecular weight polymers of vinyl acetate can be prepared by polymerization of the vinyl acetate in the presence of a special solvent.

It is therefore an object of our invention to provide a process for polymerizing vinyl acetate in the presence of a solvent to give a product having a high molecular weight. A further object of our invention is to provide a process for producing polyvinyl acetate in a form which is readily adaptable for use in preparing polyvinyl alcohol. Other objects will become apparent from a consideration of the following description.

According to the process of our invention, we prepare polyvinyl acetate of high molecular weight by polymerizing vinyl acetate in the presence of tertiary butyl alcohol.

The polymerization can be accelerated to a considerable extent by heating or using catalysts which are known to accelerate the polymerization of vinyl-type compounds. Such catalysts include the organic peroxides, especially the peroxides of organic carboxylic acids, e. g. benzoyl peroxide, acetyl peroxide, acetyl benzoyl peroxide, lauroyl peroxide, oleoyl peroxide, etc.; hydrogen peroxide; perborates (e. g. alkali metal perborates, such as sodium and potassium perborates); and persulfates (e. g. alkali metal persulfates, such as sodium, potassium and ammonium persulfates). Benzoyl peroxide has been found to be especially useful for the purposes of our invention. The temperature at which our polymerization is carried out can vary from ordinary room temperature (approximately 20–25° C.) to 72° C. (boiling point of vinyl acetate). The polymerization can be further accelerated through the use of actinic or ultra-violet light.

While the concentration of monomeric vinyl acetate in the tertiary butyl alcohol prior to polymerization can be varied widely, depending primarily on the use intended for the polyvinyl acetate, we have found that most useful results are obtained when the solution consists of from 25 to 85% by weight of vinyl acetate. The viscosity of a solution containing a small quantity of vinyl acetate is naturally less than that obtained when larger quantities of vinyl acetate are used, but even so, this viscosity is many times greater than that which would be obtained were vinyl acetate polymerized in one of the common organic solvents in the same concentration and in the same manner. We have found that especially useful polyvinyl acetate can be obtained by polymerizing a solution of vinyl acetate in tertiary butyl alcohol containing from 40 to 60% of vinyl acetate and in the presence of benzoyl peroxide as a polymerization catalyst. This concentration gives a "dope" (viscous solution) which is sufficiently fluid to be readily workable, or suitable for deacetylation to polyvinyl alcohol. The higher concentrated "dopes," e. g. those containing from 60 to 85% polyvinyl acetate, are very viscous, and are convenient sources of a high molecular weight polyvinyl alcohol. The less concentrated "dopes," e. g. those containing from 25 to 40% polyvinyl acetate are not quite so viscous, and are useful for coatings, linings, etc. Since the molecular weight of a polymer is readily determined by measuring the viscosity of its solutions, both the description of a very viscous "dope" of polyvinyl acetate, and a high molecular polyvinyl acetate are used herein to identify polyvinyl acetate which is highly polymerized. Stated in different words, the higher the molecular weight of the polyvinyl acetate, the more viscous its "dopes" with the common solvents become. Since the amount of polymerization catalyst used has a profound effect on the molecular weight, and hence the viscosity, of the polymer produced, large quantities of catalyst are to be avoided due to the effect of producing a low molecular weight polymer. Ordinarily we can use from 0.01% to 2.0% by weight, based on the vinyl acetate, of such a catalyst to advantage.

The following examples will illustrate further the manner whereby we practice the process of our invention.

EXAMPLE I

This example shows how closely the viscosity of a "dope" of polyvinyl acetate which has been prepared from a tertiary butyl alcohol solution, approaches that of polyvinyl acetate polymerized in the absence of a solvent. The viscosity of a "dope" of polyvinyl acetate, which has been prepared from a tertiary butyl alcohol solution, is also compared with other well-known solvents.

50 gms. of freshly distilled vinyl acetate were added to 30 cc. of the diluents given in the table below, and 0.05 gm. of benzoyl peroxide added. The apparatus used consisted of a glass reflux set-up, equipped with ground glass connections. After heating the reaction mixtures under reflux on a steam bath for 22 hours, the viscous solutions obtained were diluted with 200 cc. of acetone, and the solutions poured into hot distilled water to precipitate the polymers. Steam was then passed through the suspensions to remove any unreacted monomer and residual solvents. The polymers were then dried to constant weight in an oven operating at 80° C. under a vacuum of 26 inches of mercury. The molecular weight of the various polymers was determined by measuring the viscosity of their solutions in benzene. The results obtained follow:

*Table I*

| Diluent | Percent Yield of Polymer | Specific Viscosity | Inherent [1] Viscosity |
|---|---|---|---|
| None | 92.4 | .210 | 1.89 |
| Tertiary butyl alcohol | 84.2 | .186 | 1.69 |
| n-Propyl alcohol | 50.0 | .031 | .29 |
| Isopropyl alcohol | 75.4 | .023 | .22 |
| Ethyl acetate | 73.2 | .080 | .75 |
| Acetic acid | 34.0 | .047 | .44 |

[1] Calculated from the specific viscosity.

The specific viscosity was measured by dissolving 0.1 gm. of polymer in 100 cc. of benzene at 25° C. and measuring the time required for the solution to flow through an orifice. The calculations were made from the equations:

$$\eta_{sp} = \eta_{relative} - 1$$

$$\eta_{relative} = \frac{\text{Flow Time of Solution}}{\text{Flow Time of Solvent}}$$

EXAMPLE II 50 gm. samples of freshly distilled vinyl acetate were dissolved in the amounts of tertiary butyl alcohol given in the table below, and 0.05 gm. of benzoyl peroxide added.

The reaction mixtures were then refluxed on a steam bath in a glass reflux set-up equipped with ground glass joints for 22 hours. The resulting viscous solutions were then diluted with 200 cc. of acetone, and the solutions poured into hot distilled water to precipitate the polymers. The polymers were then dried and their viscosities in benzene determined as in Example I. The results obtained follow.

*Table II*

| Tertiary Butyl Alcohol | Per Cent Vinyl Acetate in Monomeric Solution | Per Cent Yield of Polymer | Specific Viscosity | Inherent [1] Viscosity |
|---|---|---|---|---|
| 0 | 100 | 92.4 | .258 | 2.28 |
| 10 | 86 | 86.2 | .210 | 1.89 |
| 30 | 68 | 81.2 | .201 | 1.82 |
| 70 | 50 | 75.4 | .138 | 1.30 |
| 90 | 41 | 74.4 | .125 | 1.17 |

[1] Calculated from the specific viscosity.

EXAMPLE III 60 gms. of freshly distilled vinyl acetate and 0.180 gm. of benzoyl peroxide (0.3% by weight based on the vinyl acetate) were added to 40 cc. of the diluents given in the table below in a glass reflux set-up equipped with ground glass joints. The reaction mixtures were then heated on a steam bath under reflux for the times indicated in the table below. The polymers obtained were diluted with acetone, and precipitated by pouring the acetone dispersions into hot distilled water. Steam was passed through the suspensions to remove any unreacted monomer and residual solvents, and the polymers dried in an oven at 50° C. under a constant vacuum. The dried polymers were dissolved in acetone and their viscosities determined according to the equation:

$$\text{Inherent viscosity} = \frac{2.303 \log T_1/T_0}{C}$$

where $T_1$ = Flow time of solution
$T_0$ = Flow time of solvent
$C$ = Concentration of polymer in grams per 100 cc. of solution (in this case $C = 0.25$).

The results obtained were as follows:

*Table III*

| Diluent | Time | Yield | Inherent Viscosity |
|---|---|---|---|
| | *Hours* | *Per cent* | |
| None | 1.5 | (a) | 3.62 |
| Tertiary Butyl alcohol | 3.5 | 85.1 | 2.69 |
| n-Butyl alcohol | 3.5 | 60.5 | 0.54 | a Yield was not determined since there was considerable loss due to insolubilization along the heated surfaces of the flask.

The above example shows that the marked increase in molecular weight of polyvinyl acetate observed in the case of tertiary butyl alcohol is not shared by all of the butyl alcohols. The yields of polymer were also higher when tertiary butyl alcohol was the solvent.

EXAMPLE IV 400 gms. of freshly distilled vinyl acetate were dissolved in 600 cc. of the diluents given in the table below, and benzoyl peroxide was added in the quantities given in the table. The apparatus used consisted of a glass reflux set-up, equipped with ground glass joints. The reaction mixtures were then held under reflux for the times given in the table below, and the reaction mixtures diluted with acetone. After precipitating the polymers in hot distilled water and drying in a hot air oven as described in Example I, the polymers were dissolved in acetone and their inherent viscosities measured at a concentration of 0.250 gm. per 100 cc. of solvent as described above in Example III. The results obtained are given in the table below.

*Table IV*

| Diluent | Per Cent Catalyst | Time | Inherent Viscosity |
|---|---|---|---|
| Tertiary Butyl alcohol | 0.3 | 3 hours | 1.29 |
| Methyl alcohol | 0.3 | 45 hours | 0.29 |
| Benzene | 0.3 | 22 hours | 0.58 |
| Ethyl acetate | 0.1 | 6 days | 0.50 |
| Methyl acetate | 0.1 | do | 0.73 |

Each of the above diluents, with the exception of tertiary butyl alcohol, is a well-known solvent useful in the polymerization of vinyl acetate and it can be clearly seen from the above table that tertiary butyl alcohol gives a polymer having a molecular weight many times greater than any of these conventional solvents. Tertiary butyl alcohol gives a higher molecular weight polymer than either ethyl or methyl acetates, even though less polymerization catalyst was used in the case of the latter two solvents. Tertiary butyl alcohol also gave a polyvinyl acetate having a molecular weight much higher than the polyvinyl acetate prepared in any of the other solvents, even though a much shorter heating period was used. As noted above, larger percentages of catalyst give a lower molecular weight polymer.

EXAMPLE V 400 gms. of freshly distilled vinyl acetate were dissolved in 1530 cc. (1200 gms.) of tertiary butyl alcohol and 1.2 gms. of benzoyl peroxide added as a polymerization catalyst. The mixture was heated on steam bath under a reflux condenser for 22 hours. A clear, viscous solution was obtained and the polymer was precipitated by pouring the solution into hot water, and the polymer washed with more hot water to remove residual solvent, unreacted monomer and catalyst decomposition products. The polymer was then dried to constant weight in a hot air oven heated at 60° C. When 0.25 gm. of this polyvinyl acetate was dissolved in 100 cc. of acetone, the resulting solution was found to have an inherent viscosity of 0.70.

Operating in a similar manner, vinyl acetate can be polymerized in tertiary butyl alcohol in other concentrations to give polyvinyl acetate of high molecular weight. As noted above, while the less concentrated solutions of vinyl acetate in tertiary butyl alcohol give a polymer solution which is not as viscous as the more concentrated solutions, these polymer solutions are many times more viscous than those obtained when vinyl acetate, in the same concentration, is polymerized in other common organic solvents. The economic advantages offered by tertiary butyl alcohol are considerably more inviting than those of other solvents, and solvent polymerization of vinyl acetate is thus reduced to a practical basis for the first time.

What we claim and desire secured by Letters Patent of the United States is:

1. A process for preparing polyvinyl acetate of high molecular weight which consists in heating a solution of vinyl acetate in tertiary butyl alcohol in the presence of a peroxide polymerization catalyst.

2. A process for preparing polyvinyl acetate of high molecular weight which consists in heating a solution of vinyl acetate in tertiary butyl alcohol in the presence of a carboxylic acid peroxide polymerization catalyst.

3. A process for preparing polyvinyl acetate of high molecular weight which consists in heating a solution of vinyl acetate in tertiary butyl alcohol in the presence of benzoyl peroxide.

4. A process for preparing polyvinyl acetate of high molecular weight which consists in heating a solution of vinyl acetate in tertiary butyl alcohol, said solution containing from 25 to 85% by weight of vinyl acetate in the presence of a peroxide polymerization catalyst.

5. A process for preparing polyvinyl acetate of high molecular weight which consists in heating a solution of vinyl acetate in tertiary butyl alcohol, said solution containing from 25 to 85% by weight of vinyl acetate, in the presence of a carboxylic acid peroxide polymerization catalyst.

6. A process for preparing polyvinyl acetate of high molecular weight which consists in heating a solution of vinyl acetate in tertiary butyl alcohol, said solution containing from 25 to 85% by weight of vinyl acetate, in the presence of benzoyl peroxide.

7. A process for preparing polyvinyl acetate of high molecular weight which consists in heating a solution of vinyl acetate in tertiary butyl alcohol, said solution containing from 40 to 60% by weight of vinyl acetate, in the presence of a peroxide polymerization catalyst.

8. A process for preparing polyvinyl acetate of high molecular weight which consists in heating a solution of vinyl acetate in tertiary butyl alcohol, said solution containing from 40 to 60% by weight of vinyl acetate, in the presence of a carboxylic acid peroxide polymerization catalyst.

9. A process for preparing polyvinyl acetate of high molecular weight which consists in heating a solution of vinyl acetate in tertiary butyl alcohol, said solution containing from 40 to 60% by weight of vinyl acetate, in the presence of benzoyl peroxide.

10. A process for preparing polyvinyl acetate of high molecular weight which consists in heating a solution of vinyl acetate in tertiary butyl alcohol, said solution containing 40% by weight of vinyl acetate in the presence of a peroxide polymerization catalyst.

11. A process for preparing polyvinyl acetate of high molecular weight which consists in heating a solution of vinyl acetate in tertiary butyl alcohol, said solution containing 50% by weight of vinyl acetate in the presence of a peroxide polymerization catalyst.

12. A process for preparing polyvinyl acetate of high molecular weight which consists in heating a solution of vinyl acetate in tertiary butyl alcohol, said solution containing 67% by weight of vinyl acetate in the presence of a peroxide polymerization catalyst.

LOUIS M. MINSK.
ERLE W. TAYLOR.

REFERENCES CITED

The following references are of record in the file of this patent:

UNITED STATES PATENTS

| Number | Name | Date |
| --- | --- | --- |
| 1,988,529 | Werntz | Jan. 22, 1935 |
| 2,409,996 | Roedel | Oct. 22, 1946 |
| 2,439,528 | Roedel | Apr. 13, 1948 |
| 2,462,678 | Roedel | Feb. 22, 1949 |
| 2,467,234 | Sargent et al. | Apr. 12, 1949 |
| 2,479,367 | Joyce et al. | Aug. 16, 1949 |

FOREIGN PATENTS

| Number | Country | Date |
| --- | --- | --- |
| 46,660 | Norway | July 1, 1929 |